Figure 1:
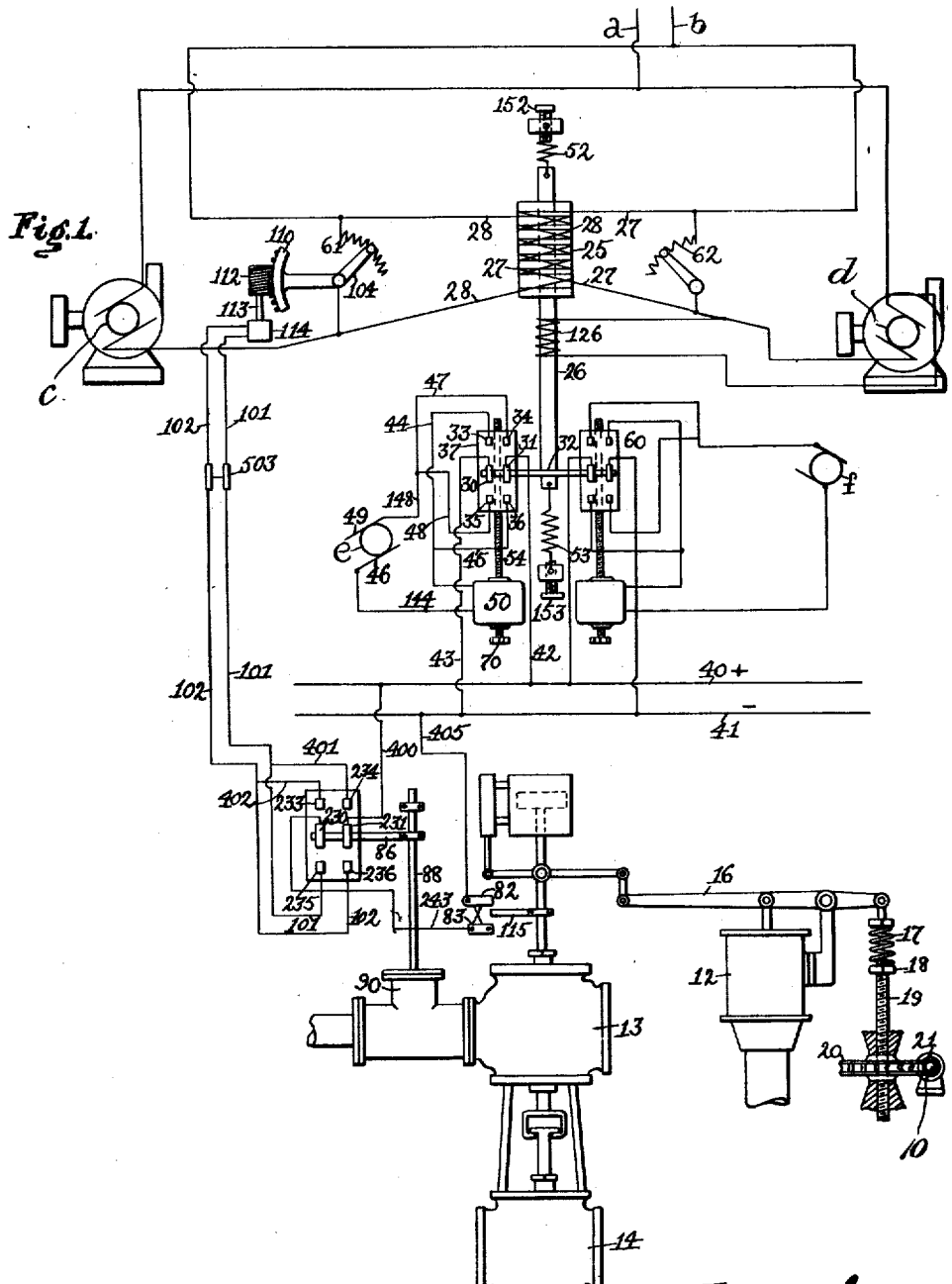

F. R. C. BOYD.
APPARATUS FOR CONTROLLING THE OPERATION OF WORK PRODUCERS OPERATING IN PARALLEL.
APPLICATION FILED APR. 21, 1916.

1,355,447.

Patented Oct. 12, 1920.

2 SHEETS—SHEET 1

Inventor
Frederic R. C. Boyd
by Jas. H. Churchill
atty.

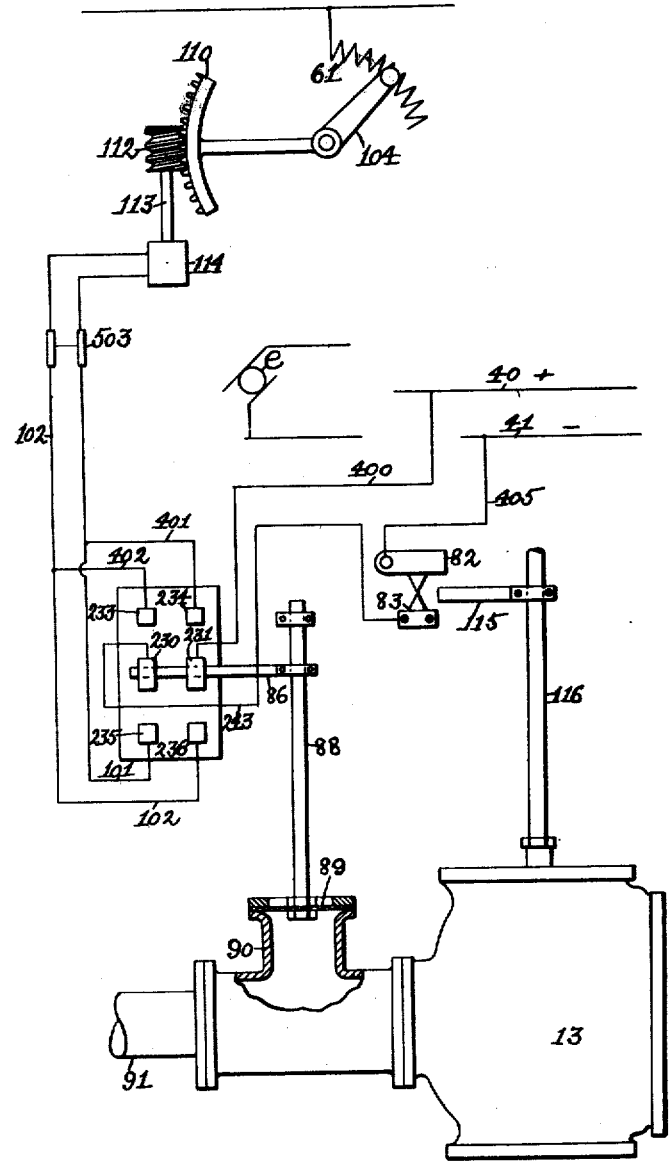

UNITED STATES PATENT OFFICE.

FREDERIC R. C. BOYD, OF BOSTON, MASSACHUSETTS, ASSIGNOR OF ONE-THIRD TO MATTHEW C. BRUSH, OF BOSTON, MASSACHUSETTS, AND ONE-THIRD TO JAMES H. NEAL, OF CAMBRIDGE, MASSACHUSETTS.

APPARATUS FOR CONTROLLING THE OPERATION OF WORK-PRODUCERS OPERATING IN PARALLEL.

1,355,447.   Specification of Letters Patent.   Patented Oct. 12, 1920.

Application filed April 21, 1916. Serial No. 92,753.

*To all whom it may concern:*

Be it known that I, FREDERIC R. C. BOYD, a citizen of the United States, residing in Boston, in the county of Suffolk and State of Massachusetts, have invented an Improvement in Apparatus for Controlling the Operation of Work-Producers Operating in Parallel, of which the following description, in connection with the accompanying drawings, is a specification, like characters on the drawings representing like parts.

This invention relates to apparatus for controlling the operation of a plurality of energy or work producers or converters operating in parallel and hereinafter termed work producers, and has for its object to provide means responsive to variations in the relative output or input of the said work producers, for automatically effecting and if desired maintaining a balance in the relation between the same.

The invention is especially adapted among other uses, to be employed for controlling the output of alternating current generators driven by steam or other elastic fluid turbines, the latter being connected with high and low pressure fluid supplies, and in the present instance, I have illustrated the invention in connection with steam turbine electric generators, one of which is connected with the high pressure steam supply only, and the other of which is connected both to the variable low pressure steam supply and to the high pressure steam supply, said generators operating in parallel to supply single phase alternating current to the same electric circuit, which will be hereinafter referred to as the main line or working circuit, so that when the load on the line or working circuit varies, this variation will be automatically distributed to the electric generators in the desired or proper proportions to effect the balance desired, or when the supply of low pressure steam varies and thereby disturbs the balance previously existing, the desired balance will be restored and if desired maintained.

Turbine electric generators working in parallel are now used for supplying current to the same electric circuit, and the turbines of said generators are now provided with governors, which are responsive to the speed of the turbines and operate suitable valves for controlling the supply of high and low pressure steam to the turbines, and these governors are now generally adjusted by electric motors which are controlled by an operator, commonly at the station containing the turbine generators.

The manual control of the governor motors is unsatisfactory, for the reason that with varying station loads or with varying amounts of low pressure steam available for the low pressure turbine or both, the operator is called upon to make frequent re-adjustments of the governors.

In accordance with the present invention, the governor motor for the low pressure turbine, and if desired also that for the high pressure turbine, is automatically controlled by means, which is responsive to variations in the relative output or input of the work producers, namely, the turbine driven electric generators, said means acting to operate the governor motor of one and if desired of both work producers, so as to effect and if desired maintain the proper balance of the current supplied to the main line by said turbine generators.

One form of such means, which may and preferably will be preferred, consists of a differentially wound solenoid, whose armature or core is polarized and operatively connected with the movable member of a circuit controller, which controls the circuit of the governor motor or motors, as will be described.

This form of controlling means will be hereinafter referred to as a stabilizer and may be constructed so that both turbine generators may carry equal "loads" or it may be arranged so that the total "load" may be apportioned as desired between both generators.

Another feature of the invention consists in providing a circuit controller which is responsive to changes in conditions in the supply pipe of the low pressure turbine generator and which may be used to control the governor motor directly or indirectly through the stabilizer as will be described.

These and other features of this invention will be pointed out in the claims at the end of this specification.

Figure 1 is a diagrammatic view of an apparatus embodying this invention.

Fig. 2, an enlarged detail in elevation and diagram of a portion of the apparatus shown in Fig. 1.

Referring to the drawing, $a$, $b$, represent the line wires of a single phase main line or working circuit, leading from a power house or central station, containing current generators $c$, $d$, which may be of any suitable construction and for the purpose of this case may be supposed to be turbine driven generators, such as now commonly used in power houses and central stations.

The turbine driven generator $c$ may be considered a low pressure unit, that is one in which the turbine is operated by low and high pressure steam, and the turbine driven generator $d$ may be considered a high pressure unit.

The turbo-generators $c$, $d$, are provided with the usual speed responsive governors for controlling the steam inlet valves for the said generators, which governors are adjustable by electric motors, operatively connected with the said governors. In Fig. 1, I have represented the electric motor $e$, which is operatively connected with the governor controlling the valve or valves of the low pressure turbine $c$, and the electric motor $f$ for the governor of the high pressure turbine $d$.

In Fig. 1, I have also illustrated one form of operative connection between the armature shaft 10 of the governor motor $e$ and the governor 12 controlling the valves 13, 14, which control the supply of low and high pressure steam respectively to the low pressure turbine $c$, which latter, as commonly used, has provision for utilizing high pressure steam and which is sometimes referred to as a mixed pressure turbine, although its primary purpose is to utilize low pressure steam and therefore is commonly known as a low pressure turbine.

As shown in Fig. 1, the governor 12 has its lever 16 connected at one end to a spring 17, which is capable of being extended by a collar 18 on a threaded rod 19 provided with a worm gear 20, which is rotated by a worm 21 on the armature shaft 10 of the motor $e$. Rotation of the armature shaft 10 in one direction causes the spring 17 to be extended, thereby externally "loading" the governor and causing it to operate the valves 13, 14, so as to supply an increased quantity of steam to the low pressure turbine $c$, and rotation of said armature in the opposite direction permits the spring 17 to contract, thereby externally "unloading" the governor and causing it to operate the valves 13, 14, so as to reduce the quantity of steam supplied to the low pressure turbine. The low and high pressure valves 13, 14, in practice, are arranged so that the low pressure valve opens substantially its full distance before the high pressure valve starts to open.

The governor motor $e$ in accordance with this invention is automatically controlled by means responsive to the relative output of the turbo-generators, and one form or construction of such means comprises a differentially wound electromagnet in the form of a solenoid 25, provided with a polarized armature or core 26. One winding or coil 27 of the solenoid 25 is connected in circuit with the high pressure steam driven generator $d$, and the other winding or coil 28 is connected in circuit with the low pressure steam driven generator $c$, and said coils oppose each other and for the purpose of illustration may be supposed to be of equal strength. The core 26 is operatively connected with a circuit controller or switch, which controls the circuit of the governor motor $e$, and may be polarized by a coil 126 on it, which coil is connected with the circuit of the generator $d$. In the present instance, the switch is shown as two movable contact members 30, 31, which are secured to a carrier 32, attached to the core 26 to move therewith. The contact members 30, 31, coöperate with two sets of terminals or stationary contact members, one set comprising two terminals 33, 34, and the other set, two terminals 35, 36. The sets of stationary contact members are secured to a suitable base or block 37, preferably of insulating material, and are located thereon so that the movable members 30, 31, are located between them. The governor motor $e$ is designed to be connected in circuit with a suitable source of current supply by said switch, so as to rotate the armature shaft 10 of said motor in opposite directions, according to which set of stationary contact members, the movable contact members 30, 31, engage.

In the present instance, the source of current supply is represented by the control line wires 40, 41, which may be considered positive and negative control line wires. One of the movable contact members as 31 is connected by wire 42 with the positive wire 40, and the other member 30 is connected by wire 43 with the negative wire 41. The stationary contact members 33, 36, are connected by wires 44, 45, 144 with one brush 46 of the motor $e$, and the contact members 34, 35, are connected by wires 47, 48, 148, with the other brush 49 of the motor $e$. —

In the present instance, the wire 144 includes a motor 50 for a purpose as will be described.

By reference to Fig. 1, it will be seen that when the solenoid 25 is energized so as to move the contact members 30, 31, into engagement with the stationary contact members 33, 34, the circuit of the motor $e$ will be closed, and current will flow in one direction through said motor so as to revolve its armature shaft 10 in one direction. This circuit may be traced as follows: from the positive wire 40 by wire 42 to movable contact member 31, thence by the stationary contact member 34 and wire 47, 148, to brush 49 of the motor $e$, thence through said motor, brush 46, wire 144, motor 50, and wire 44 to stationary contact member 33, thence by movable contact member 30 and wire 43 back to the negative wire 41.

When the solenoid is energized so that the contact members 30, 31, are moved into engagement with the stationary contact members 35, 36, the circuit through the motor $e$ is completed so that the current flows in the reverse direction, and the armature shaft 10 is rotated in the reverse direction.

The circuit through the motor $e$ in this case, may be traced as follows:—from the positive wire 40 by wire 42 to movable contact member 31, thence by stationary contact member 36, wire 45, motor 50, wire 144 to brush 46, thence through motor $e$, brush 49, wires 148, 48, contact members 35, 30, and wire 43 to negative wire 41.

It will be observed that the movable contact members 30, 31, are moved in one direction into engagement with the stationary contact members 33, 34, when the core 26 is attracted by the coil 27, which takes place when the condition of the main line circuit is such that the current output of the high pressure generator $d$ predominates or overbalances the current output of the low pressure generator $c$, whereas when this condition is reversed and the current output of the low pressure generator $c$ predominates, the core 26 is moved in the opposite direction by the coil 28, and the movable contact members 30, 31, are moved into engagement with the stationary contact members 35, 36. When the current output of both generators $c$, $d$, is equal, then both coils 27, 28, attract the core equally in opposite directions and a balanced condition is obtained, and the movable contact members 30, 31, are disengaged from both sets of stationary contact members, after the manner represented in Fig. 1, and at such time, the governor motor $e$ is inactive.

In operation with the stabilizer as thus far described, let it be assumed that when the core of the solenoid 25 is moved upward to close the circuit of the motor $e$ between the contacts 30, 31, 33, 34, that the motor $e$ runs in the proper direction to "speed up" the governor of the generator $c$, and when the core is moved downward to close the circuit of the motor $e$ between the contact members 30, 31, 35, 36, the motor $e$ runs in the proper direction to "slow down" the governor of the generator $c$.

Now irrespective of the total station load, if both generators $c$, $d$, are contributing equal outputs to the main line $a$, $b$, the net "pull" on the differential solenoid core or armature is "zero", and the movable contact member or members remain in "mid-position" as shown in Fig. 1.

If, for any reason, the output of the high pressure turbine generator $d$ becomes greater than that of the low pressure turbine generator $c$, the effect of its coil 27 becomes greater than the effect of the coil 28 of the low pressure turbine generator $c$, causing the armature or core 26 to move upward and close the circuit of the governor motor $e$, and thereby start the latter in the proper direction to "speed up" the governor of the low pressure turbine generator $c$.

Unless otherwise prevented, the armature or core 26 will remain up until the unbalance in the outputs of the generators $c$, $d$, is completely overcome, and this might result in "overdoing" the desired action, as a result of which the solenoid would become unbalanced "downward" causing the operation to be reversed, and the continuation of these operations would result in what might be termed "hunting," which is not desirable.

This "hunting" action may be avoided in a number of ways, and in the present instance I have shown two methods either of which may be used alone or both may be used in conjunction.

One method to avoid "hunting" is to mount the core or armature 26 between two springs 52, 53, having a certain amount of initial tension and provided with suitable adjusting screws 152, 153. Another method is to mount the block or base 37 carrying the movable contacts, on a screw 54, which is driven by the motor 50 in series with the governor motor $e$ to act as a "follow up device," that is, to move the block 37 and the contacts 33, 34, in a direction away from the contacts 30, 31, as the relation of the coils 27, 28, approaches the balanced condition. Provision is also made for manually moving the block 37 to adjust the relation of the contacts, which may be effected independently of the governor adjustment, by providing the screw rod 54 with a hand wheel 70.

If desired, the motor $f$ may be used in connection with the governor of the high pressure turbine generator $d$, and controlled by a circuit controller which may be designated by the member 60, as it is a duplicate of the circuit controller used with the motor

*e*, and the motor *f* may be connected with its circuit controller in such manner as to act reversely to the motor *e*, that is, to "slow down" the governor of the generator *d* when the governor of the generator *c* is "speeded up," and vice versa.

It may be desirable to have both the high and low pressure units *d*, *c*, arranged to carry at all times "equal loads," but it is not desired to limit the invention in this respect, as it may be desired to have either unit carry a proportionate amount of the load, that is, the total load may be apportioned between the two units *c*, *d*, in any predetermined amount by means of adjustable shunts 61, 62, in either or both legs of the circuit containing the generators *c*, *d*, or in any other suitable manner, as by varying the number of active turns in the coils 27, 28, of the solenoid. The levers of the shunts 61, 62, or either of them, may be operated manually or under certain conditions automatically, as, for example, as illustrated in the present instance by variation in the pressure of the low pressure steam supplied to the low pressure turbine generator *c*.

In the present instance, it may be desirable to have one of the work producers, as, for instance, the low pressure producer *c* capable of carrying more than its proportionate share of the load, in order to utilize all of the low pressure steam available, and for this purpose, I have provided means actuated by the low pressure steam for varying the operation of the stabilizer or of the speed responsive governor of the low pressure producer, for a purpose as will be described.

To this end I employ a circuit controller having its movable member responsive to an increase in pressure of the low pressure steam which member controls an electric circuit and effects the operation of the motor *e*. The effect upon the motor *e* as illustrated in Figs. 1 and 2, is indirect.

When the indirect method, which may be used in conjunction with the other elements of the stabilizer as described herein, is employed, a small motor 114 is employed, whose armature shaft 113 is provided with a worm 112 engaging a segmental gear 110, whereby the position of the lever 104 for the shunt 61 may be varied.

The motor 114 is controlled by the contact arm 86 attached to a stem or rod 88, fastened to a diaphragm 89, (see Fig. 2) forming part of a fitting 90, which is included in the supply pipe 91 for the low pressure valve 13. The diaphragm 89 responds to variations in pressure of the steam in the supply pipe 91, and moves the contact arm 86 carrying the movable contacts 230, 231, into engagement with the upper fixed contacts 233, 234, or the lower fixed contacts 235, 236.

When the contact arm 86 is in an intermediate position, as shown, no current flows through any portion of the circuit of the motor 114, which latter remains at rest. When the contact arm 86 moves into its upper contact position, the circuit of the motor 114 controlled by the pressure operated member may be traced as follows:—from the positive wire 40 by wire 400 to movable contact member 231, thence by stationary contact member 234, and wires 401, 101 to motor 114, thence through said motor, wires 102, 402, to stationary contact member 233, thence by movable contact member 230 and wire 243 through limiting switch 83, 82, to be referred to later, and by wire 405 back to the negative wire 41.

When the contact arm 86 moves into its lower contact position, the circuit as formed is such as to cause the current to pass through the motor 114 in the opposite direction to that just described, thereby reversing the direction of the motor 114 and consequently of the movement of the arm 104 over the shunt 61. This circuit may be traced as follows:—from positive wire 40, by wire 400, contacts 231, 236, wire 102, motor 114, wire 101, contacts 235, 230, wire 243, switch 83, 82, and wire 405 to negative wire 41. In the present instance the circuit of the motor 114 is shown as provided with a switch 503.

As the pressure of the steam in the supply pipe 91 increases or decreases beyond a predetermined value, the contact arm, 86 causes contact to be made either upward or downward, thereby causing the motor 114 to rotate in one direction or the other. The operation of the motor 114 by varying the shunt resistance 61, in turn varies the relative strength of the effective pull of the winding 28 on the differential solenoid 25, thereby in turn causing the motor *e* to operate in the desired direction to increase or decrease the proportion of the total load being carried by the main low pressure turbine generator *c*.

The contacts 82, 83, form a limiting switch or circuit controller, which may be operated by an arm 115 on the stem 116 of the low pressure valve 13, so as to open the circuit of the motor *e* and prevent causing the low pressure valve 13 to be moved beyond its wide open position, which if permitted would start to open the high pressure valve 14, which is not desired under the conditions referred to, that is when the motor *e* is to be operated in response to changes in the conditions in the low pressure steam supply. It will be understood, that when the shunt lever 104 is operatively connected with the thermostat or pressure device in the supply pipe 91 for the low pressure valve 13, the arm 115 is arranged to engage the member 82 of the limiting switch, but when said thermostat or pressure device is not used in the supply pipe 91 for the low pressure valve, the arm 115 may be removed from the stem 116 or may be turned thereon so as not to act on the switch member 82.

I have described the controlling apparatus or stabilizer, as I prefer to call it, as used in connection with a high and a low pressure turbine, but it is not desired to limit the invention to the particular form of energy or work producer or converter herein shown, as it is applicable for use with other forms of speed responsive mechanism, such, for instance, as water wheels, gas engines, or with any kinds of prime movers or other apparatus working in parallel, whether similar or dissimilar, and whether located relatively near together or widely separated, as, for example, in the case of a hydro-electric plant at a distance, operating in parallel with a steam or oil engine plant.

In the present instance, I have illustrated the invention in its simplest form, as might be applied to two small single phase generators of moderate voltage, but it is not desired to limit the invention in this respect, for when used with larger generators, proportional currents as derived from current transformers may be used in the differential solenoid. When used with polyphase generators, the output of one phase or several could be used, and in high voltage generators, the excitation of the polarized armature could be derived from a potential transformer, and suitable dash pots may be used with said armature and elsewhere to avoid too sudden movement if desired. These various devices are well known and their uses fully understood, and consequently it is deemed unnecessary to illustrate the same.

Claims.

1. In an apparatus of the character described, in combination, a plurality of turbine electric generators, a circuit with which both of said generators are connected in parallel, a speed responsive governor for one of said generators, an electric motor for varying the operation of said governor, a circuit controller for said electric motor, a differentially wound electromagnet having opposing coils connected in circuit with said generators, and a polarized armature for said magnet operatively connected with said circuit controller to effect movement of the same to control the operation of said electric motor and movable by a variation in relative strengths of the coils of said electromagnet when a variation occurs in the relative output of current by said generators.

2. In an apparatus of the character described, in combination, a plurality of turbine electric generators, a circuit with which both of said generators are connected in parallel, a speed responsive governor for one of said generators, an electric motor for varying the operation of said governor, a circuit controller for said electric motor, and means for operating said circuit controller to control the operation of said electric motor, said means being responsive to said generators individually and rendered active by a variation in the relative output of the current by said generators to operate said circuit controller.

3. In an apparatus of the character described, in combination, a plurality of work producers, speed responsive devices therefor, an electric motor for varying the operation of one of said speed responsive devices, a circuit controller for said electric motor, and means for operating said circuit controller to control the operation of said electric motor, said means being responsive to said work producers individually and rendered active by variations in the relative output of said work producers to operate said circuit controller and effect and maintain a desired balance between the said work producers.

4. The combination with a plurality of apparatus working in parallel, one of which is a low pressure turbine generator, of a stabilizer responsive to variations in the relative output of the said apparatus for automatically effecting a desired balance in the relation between said apparatus, a speed responsive governor for said low pressure turbine generator, a motor for varying the operation of said governor, and means responsive to variations in the conditions in the supply pipe for said low pressure generator for automatically affecting said stabilizer.

5. The combination with a plurality of apparatus working in parallel, one of which is a low pressure turbine generator, of a stabilizer responsive to variations in the relative output of the said apparatus for automatically effecting a desired balance in the relation between said apparatus, a speed responsive governor for said low pressure turbine generator, a motor for varying the operation of said governor, a circuit controller responsive to variations in the conditions in the supply pipe for said low pressure generator for automatically affecting the said motor through the medium of the said stabilizer.

6. The combination with a plurality of apparatus working in parallel, one of which is a low pressure turbine generator, of a stabilizer responsive to variations in the relative output of the said apparatus for automatically effecting a desired balance in the relation between said apparatus, a speed responsive governor for said low pressure turbine generator, a motor for varying the operation of said governor, and a circuit controller responsive to variations in the conditions in the supply pipe for said low pressure generator for automatically affecting said motor.

7. The combination with a low pressure turbine generator having a supply pipe, of a circuit controller provided with a movable member which is operatively connected with the supply pipe of the said turbine generator to be moved solely in response to variations in the conditions in the said supply pipe, a speed responsive governor for said low pressure turbine generator, and a motor for varying the operation of said governor, said motor being controlled by and responsive to the individual operation of said circuit controller.

8. The combination with a low pressure turbine generator having a supply pipe, of a circuit controller provided with a movable member which is operatively connected with the supply pipe of the said turbine generator to be moved in response to variations in the conditions in the said supply pipe, a speed responsive governor for said low pressure turbine generator, a motor to operate said governor, a stabilizer governing the operation of said motor, a shunt circuit for said stabilizer, and a motor governing said shunt and controlled by said circuit controller.

9. The combination with a low pressure turbine generator having a supply pipe, of a circuit controller provided with a movable member which is operatively connected with the supply pipe of the said turbine generator to be moved in response to variations in the conditions in the said supply pipe, a speed responsive governor for said low pressure turbine generator, a motor to operate said governor, a stabilizer governing the operation of said motor, and means governed by said circuit controller for affecting the operation of said stabilizer.

10. The combination with a low pressure turbine generator having a supply pipe, and a high pressure turbine generator working in parallel with said low pressure turbine generator, a speed responsive governor for one of said generators, an electric motor for operating said governor, and a circuit controller responsive solely to variations in the conditions in the supply pipe for said low pressure turbine generator and controlling said motor to cause the latter to respond to the conditions in the supply pipe independently of extraneous conditions.

11. In an apparatus of the character described, in combination, a high pressure turbine generator, a low pressure turbine generator, a circuit with which both of said generators are connected in parallel, a speed responsive governor for said low pressure turbine generator, a motor for varying the operation of said governor, and means responsive solely to variations in the conditions in the supply pipe for said low pressure generator for automatically affecting said motor and independently of extraneous conditions.

12. The combination with a low pressure turbine generator having a supply pipe, a speed responsive governor for said low pressure turbine generator, a motor for varying the operation of said governor, and a circuit controller for said motor responsive solely to the conditions in said supply pipe alone and independently of the high pressure functioning of said low pressure turbine to cause the circuit of the motor to be completely closed or opened and the motor to be started or stopped according to said variations.

13. The combination with a low pressure turbine generator having a supply pipe, a speed responsive governor for said low pressure turbine generator, a motor for varying the operation of said governor, a circuit controller for said motor responsive to the conditions in said supply pipe to cause the circuit of the motor to be completely closed or opened and the motor to be started or stopped according to said variations, and electrically operated means for opening the circuit of the circuit controller when the condition in the supply pipe which caused the closing of the circuit controller has been changed as desired.

14. The combination with a low pressure turbine generator having a supply pipe, a speed responsive governor for said low pressure turbine, a motor for varying the operation of said governor, a circuit controller for said motor responsive to a condition in the said supply pipe to automatically close the circuit of the motor, and means for automatically opening the circuit of the motor when the condition in the supply pipe which caused the closing of the motor circuit has been changed as desired.

15. The combination with a low pressure turbine generator having a supply pipe, a high pressure turbine generator working in parallel with said low pressure turbine generator, a speed responsive governor for one of said generators, an electric motor for operating said governor, and a circuit controller for said motor responsive to variations in the conditions in the supply pipe for said low pressure turbine generator to cause the motor to be operated independently of the high pressure turbine generator.

16. The combination with a low pressure turbine generator having a supply pipe, a speed responsive governor for said low pressure turbine, a motor for varying the operation of said governor, means governing the operation of said motor and responsive to a condition in the said supply pipe to automatically start the motor in operation, and means for automatically rendering the said motor inactive when the condition in the said supply pipe which rendered the motor active has been changed as desired.

17. The combination with a low pressure turbine generator having a supply pipe, a speed responsive governor for said low pressure turbine, a motor for varying the operation of said governor, a circuit controller for said motor having a member responsive to a condition in the said supply pipe to automatically close the circuit of the said motor, and having a second member coöperating with the first-mentioned member, and means responsive to the closed condition of the circuit of said motor to operate said second member and open the circuit of said motor to prevent hunting.

In testimony whereof, I have signed my name to this specification.

FREDERIC R. C. BOYD.